(12) United States Patent
Kobayashi

(10) Patent No.: US 6,889,006 B2
(45) Date of Patent: May 3, 2005

(54) AUXILIARY LENS FOR CAMERA AND THE LIKE

(75) Inventor: Fumio Kobayashi, Saitama-ken (JP)

(73) Assignee: Toda Seiko Co., Ltd., Saitama-ken (JP)

(*) Notice: Subject to any disclaimer, the term of this patent is extended or adjusted under 35 U.S.C. 154(b) by 0 days.

(21) Appl. No.: 10/630,760

(22) Filed: Jul. 31, 2003

(65) Prior Publication Data

US 2004/0252987 A1 Dec. 16, 2004

(30) Foreign Application Priority Data

Jun. 2, 2003 (JP) ........................................ 2003-003173

(51) Int. Cl.⁷ .............................................. G03B 17/02
(52) U.S. Cl. ............................ 396/6; 396/530; 348/552
(58) Field of Search ........................ 348/552; 396/71, 396/529, 530, 544

(56) References Cited

U.S. PATENT DOCUMENTS

| | | | | | |
|---|---|---|---|---|---|
| 2,953,970 | A | * | 9/1960 | Maynard | ................... 359/611 |
| 4,279,463 | A | * | 7/1981 | Little | ...................... 359/399 |
| 5,005,109 | A | * | 4/1991 | Carleton | ................... 362/509 |
| 5,208,624 | A | * | 5/1993 | MacKay | ................... 396/544 |

FOREIGN PATENT DOCUMENTS

DE          A1 10 68 549         11/1959

* cited by examiner

*Primary Examiner*—David M. Gray
(74) *Attorney, Agent, or Firm*—Venable; Michael A. Sartori

(57) ABSTRACT

An auxiliary lens for a camera and the like includes a washer to be mounted to a camera and an auxiliary-lens body to be joined to the washer to thereby be mounted to the camera. The auxiliary-lens body has an adhering section made of a permanent magnet, ferromagnetic substance or a magnetic substance at the position to be mounted to the camera. The washer is made of a ferromagnetic substance, a magnetic substance or a permanent magnet that can adhere to the adhering section of the auxiliary-lens body. Thus, mounting the washer to the camera with a double-faced tape or the like allows the auxiliary lens to be mounted to the camera and the like through the washer by a magnetic force.

7 Claims, 1 Drawing Sheet

AUXILIARY LENS FOR CAMERA AND THE LIKE

BACKGROUND OF THE INVENTION

1. Field of the Invention

The present invention relates to an auxiliary lens such as a conversion lens and a filter used for cameras and products with a built-in camera including a cellular phone with a built-in camera, and more particularly, concerns an auxiliary lens including an auxiliary-lens body and a washer connected to the auxiliary-lens body at one end face and mounted to a camera and the like at the other end and being capable of connection between the washer and the auxiliary-lens body by a magnetic force.

In the present invention, the auxiliary lens denotes "that which is joined to a lens of a camera and the like for changing the optical characteristic of the camera lens or protecting the camera lens in cooperation with the lens as necessary."

In the present invention, the camera and the like refer to "cameras including a digital camera and devices including an objective lens for image formation such as a cellular phone with a built-in camera and a disposable camera."

2. Description of the Related Art

As is generally known, particularly high-grade cameras are capable of mounting a so-called auxiliary lens such as a conversion lens including a telephoto lens and a wide-angle lens and a filter.

More specifically, these cameras have filter screws around a lens and the auxiliary lenses have screws to be screwed to the filter screws, which allows the auxiliary lenses to be mounted to the cameras depending on circumstances. Accordingly, the cameras are capable of telephotography and wide-angle photography by preference, thus increasing the working range of cameras.

So-called middle-class cameras, however, have no filter screws, thus being unable to use the auxiliary lenses such as a conversion lens.

In recent years, for example, digital cameras of about 3,200,000 pixels are popular, which are generally called middle-class cameras. Since the middle-class cameras have no filter screws, it is impossible to mount a conversion lens such as a telephoto lens and a wide-angle lens, thus having a problem of limiting the working range.

Even when the filter screws are provided, available conversion lenses are limited depending on the diameter of the filter, thus having a problem that desired conversion lenses are not available.

Furthermore, in mounting the conversion lenses, a system of mounting the conversion lenses by using a lens adaptor and so on is provided in addition to the filter screw system. The lens adaptors must be mounted to cameras each time the conversion lenses are mounted, thus having a problem of burdensome works.

Also, camera built-in products such as a popular cellular phone with a built-in camera are not supposed to mount the auxiliary lens, so that it is impossible to use the auxiliary lens.

SUMMARY OF THE INVENTION

Accordingly, it is an object of the present invention to provide an auxiliary lens that can easily be mounted even to cameras without filter screws and to cellular phones with a built-in camera that are not previously supposed to use an auxiliary lens.

An auxiliary lens for a camera and the like according to a first aspect of the present invention includes a washer to be mounted to a camera and the like; and an auxiliary-lens body to be joined to the washer to thereby be mounted to the camera and the like. The auxiliary-lens body has an adhering section made of a permanent magnet, a ferromagnetic substance or a magnetic substance at the position to be mounted to the camera and the like. The washer is made of a ferromagnetic substance, a magnetic substance or a permanent magnet that can adhere to the adhering section of the auxiliary-lens body.

In the auxiliary lens for a camera and the like according to a second aspect of the present invention, preferably, the washer is bonded by a user to the periphery of a lens of the camera and the like with a bonding agent.

In the auxiliary lens for camera and the like according to a third aspect of the present invention, preferably, the bonding agent is a double-faced tape, the double-faced tape being arranged on the washer in advance.

In the auxiliary lens for camera and the like according to a forth aspect of the present invention, preferably, the washer includes several kinds of washers in correspondence to the size of the lens of the camera and the like.

The auxiliary lens according to the present invention includes a washer to be mounted to a camera and the like and an auxiliary-lens body to be joined to the washer to thereby be indirectly mounted to the camera. The auxiliary-lens body has an adhering section made of a permanent magnet, a ferromagnetic substance or a magnetic substance. The washer is made of a ferromagnetic substance, a magnetic substance or a permanent magnet that can adhere to the adhering section. Thus, the washer and the auxiliary-lens body can adhere to each other by a magnetic force.

Therefore, mounting the washer at the periphery of the lens of the camera and the like with a double-faced tape or the like allows the auxiliary lens to be mounted to the camera by a magnetic force through the washer.

The auxiliary lens according to the present invention can easily be mounted even to a camera without filter screws and to a cellular phone with a built-in camera and the like that are not supposed to mount an auxiliary lens, thus increasing the working range of so-called middle-class cameras and cellular phones with a built-in camera.

Since the auxiliary lens according to the present invention employs a system of mounting the auxiliary lens to a camera and the like, mounting the washer to the camera in advance allows a desired auxiliary lens such as a conversion lens and a filter lens to be mounted to the camera depending on circumstances.

DESCRIPTION OF THE PREFERRED EMBODIMENTS

An auxiliary lens according to the present invention is made up of an auxiliary lens assembly and a washer. The washer is substantially shaped like a ring that can be mounted around a lens of a camera and the like, the whole body being made of a magnet (permanent magnet), a ferromagnetic substance or a magnetic substance. The auxiliary-lens body includes an adhering section made of a permanent magnet, a ferromagnetic substance or a magnetic substance, which allows the auxiliary-lens body to adhere to the washer by a magnetic force, with the washer mounted to the camera and the like; thus the auxiliary-lens body can be mounted to the camera through the washer.

Figure 1:
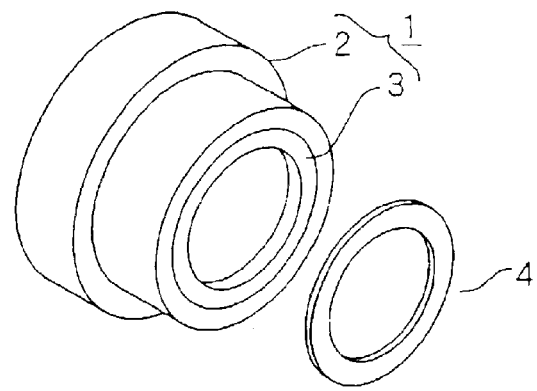
FIG. 1 is a perspective view of an accessory lens according to an embodiment of the present invention.

The auxiliary lens according to an embodiment of the present invention will be described hereinafter with reference to the drawings. FIG. 1 is a perspective view of an auxiliary lens assembly 1 according to the embodiment. The auxiliary lens of the embodiment denotes a conversion lens to be mounted to a digital camera or the like and includes an auxiliary-lens body 2 and a washer 4 to adhere to the auxiliary-lens body 2 at one end face and to be mounted to a camera and the like at the other end.

Specifically, the auxiliary-lens body 2 according to the embodiment has the same structure as that of a general conversion lens and includes all conversion lenses such as a telephoto lens and a wide-angle lens.

Figure 2:
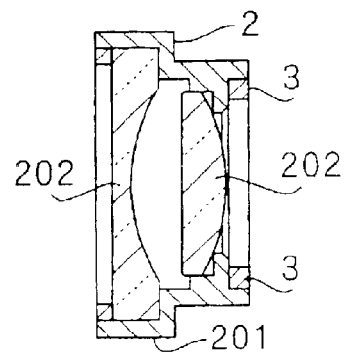
FIG. 2 is a sectional view of an auxiliary lens for explaining the structure of an auxiliary lens assembly according to the embodiment of the present invention.

FIG. 2 is a sectional view of the auxiliary-lens body 2. The auxiliary-lens body 2 of the embodiment has a lens 202 in a housing 201. Examples of the lens 202 are a telephoto lens and a wide-angle lens.

A substantially ring-shaped adhering section 3 is mounted to the side of the auxiliary-lens body 2 to be mounted to a camera, with one end face exposed, the exposed surface of the adhering section 3 serving as an adhering surface. The adhering section 3 of the embodiment is made of a permanent magnet. The method of adherence is not particularly limited, and either of adhesion and engagement may be employed.

The washer 4 of the embodiment is substantially shaped like a ring corresponding to the size of the circumference of the camera lens, the entire body being made of a ferromagnetic substance or a magnetic substance such as metal.

Therefore, with the auxiliary lens assembly 1 of the embodiment, the adhering section 3 of the auxiliary-lens body 2 is capable of adhering the washer 4 by a magnetic force. Accordingly, mounting the washer 4 to the camera in advance facilitates mounting of the auxiliary-lens body 2 to the camera.

Figure 3:
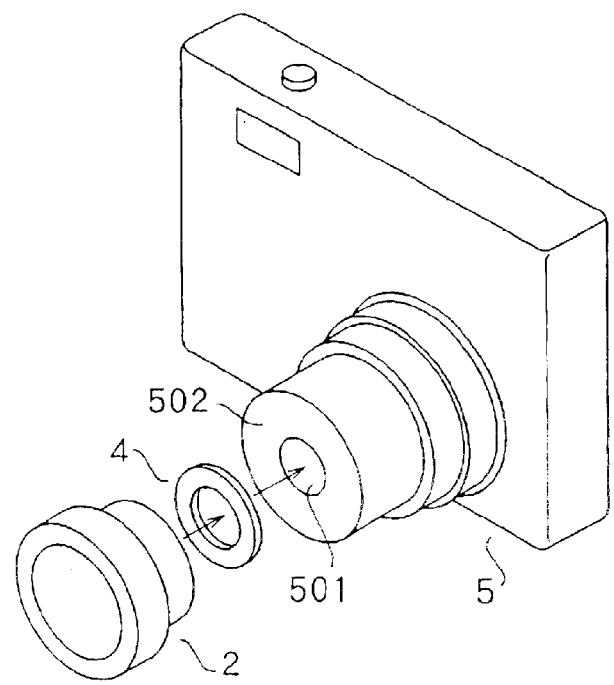
FIG. 3 is a diagram for explaining the usage of the auxiliary lens assembly according to the embodiment of the present invention.

The usage of the auxiliary lens of the embodiment will now be described. Referring to FIG. 3, the washer 4 is mounted in advance to a periphery 502 of a lens 501 of a camera 5 with a double-faced tape and so on.

The adhering surface of the adhering section 3 of the auxiliary-lens body 2 is then superposed on the washer 4. Thus, the auxiliary-lens body 2 can adhere to the washer 4 by a magnetic force, which allows the auxiliary-lens body 2 to be mounted to the camera 5.

As described above, the auxiliary lens of the embodiment includes an auxiliary-lens body 2 having an adhering section and a washer that can adhere to the adhering surface of the auxiliary-lens body at one end face and to be mounted to a camera at the other end, the adhering section and the washer being capable of adhering to each other by a magnetic force. Therefore, mounting the washer to the periphery of the lens of the camera in advance facilitates the mounting of the auxiliary-lens body. Accordingly, even a camera without filter screws is allowed to mount a conversion lens.

The above embodiment has been described for the case in which the adhering section of the auxiliary-lens body is made of a permanent magnet and a washer is made of a ferromagnetic substance or a magnetic substance such as metal. However, the auxiliary lens for a camera according to the present invention can be mounted to a camera by a magnetic force, so that there is no need to make the adhering section of a permanent magnet and to make the washer of a ferromagnetic substance or a magnetic substance. Accordingly, for example, the washer may be made of a permanent magnet and the adhering section may be made of a ferromagnetic substance or a magnetic substance, or alternatively, both of them may be made of a permanent magnet.

The above embodiment has been described with a conversion lens to be mounted to a camera as an example. The auxiliary lens of the present invention, however, is not limited to the conversion lens to be mounted to a camera and the like and can apply to all auxiliary lenses to be mounted to a camera and the like. Accordingly, they include filters to be mounted to a camera and the like and may also apply to cellular phones with a built-in camera, which have not supposed to mount an auxiliary lens.

The auxiliary lens of the present invention is embodied as described above and offers the following advantages.

The auxiliary lens according to the present invention includes a washer to be mounted to a camera and the like and an auxiliary-lens body to be joined to the washer to thereby be indirectly mounted to the camera. The auxiliary-lens body has an adhering section made of a permanent magnet, a ferromagnetic substance or a magnetic substance. The washer is made of a ferromagnetic substance, a magnetic substance or a permanent magnet that can adhere to the adhering section. Thus, the washer and the auxiliary-lens body can adhere to each other by a magnetic force.

Mounting the washer at the periphery of the lens of the camera and the like with a double-faced tape or the like allows the auxiliary lens to be mounted to the camera by a magnetic force through the washer. Thus, the auxiliary lens can easily be mounted to even a camera without filter screws and a cellular phone with a built-in camera and the like that are not supposed to mount an auxiliary lens.

Since the auxiliary lens of according to the present invention employs a system of mounting the auxiliary lens to a camera by using a magnetic force, mounting the washer to the camera in advance allows a desired auxiliary lens such as a conversion lens and a filter lens to be mounted to the camera depending on circumstances.

What is claimed is:

1. An auxiliary lens for a camera, comprising:
a washer to be mounted to the camera; and
an auxiliary-lens body to be joined to the washer to thereby be mounted to the camera; wherein
the auxiliary-lens body has an adhering section made of a permanent magnet, a ferromagnetic substance or a magnetic substance at the position to be mounted to the camera; and
the washer is a flat ring, is made of a ferromagnetic substance, a magnetic substance or a permanent magnet that can be adhered to the adhering section of the auxiliary-lens body, and is adapted to be bonded by a user to a surface surrounding a lens of the camera with a bonding agent.

2. An auxiliary lens for a camera according to claim 1, wherein the bonding agent is a double-faced tape, the double-faced tape being arranged on the washer in advance.

3. An auxiliary lens for a camera according to claim 1, wherein the washer includes several kinds of washers in correspondence to the size of the lens of the camera.

4. An auxiliary lens for an apparatus having an objective lens for image formation, comprising:
- a washer to be mounted to the apparatus having an objective lens for image formation; and
- an auxiliary-lens body to be joined to the washer to thereby be mounted to the apparatus having an objective lens for image formation; wherein
- the auxiliary-lens body has an adhering section made of a permanent magnet, a ferromagnetic substance or a magnetic substance at the position to be mounted to the apparatus having an objective lens for image formation; and
- the washer is a flat ring, is made of a ferromagnetic substance, a magnetic substance or a permanent magnet that can be adhered to the adhering section of the auxiliary-lens body, and is adapted to be bonded by a user to a surface of apparatus surrounding the lens of the apparatus having an objective lens for image formation with a bonding agent.

5. An auxiliary lens for an apparatus having an objective lens for image formation according to claim 4, wherein the apparatus includes at least one of a digital camera, a cellular phone with built-in camera, and a disposable camera.

6. An auxiliary lens for a camera according to claim 1, wherein the bonding agent is an adhesive agent.

7. An auxiliary lens for a camera according to claim 1, wherein the washer is to be mounted directly on the camera.

* * * * *